April 13, 1965　　　A. E. HILLIKER　　　3,178,684
TRAFFIC CONTROL SYSTEM
Filed Aug. 22, 1960　　　12 Sheets-Sheet 1

FIG.1.

INVENTOR:
ARTHUR E. HILLIKER,
BY *D. Emmett Thompson*
HIS ATTORNEY

April 13, 1965

A. E. HILLIKER

3,178,684

TRAFFIC CONTROL SYSTEM

Filed Aug. 22, 1960

INVENTOR:
ARTHUR E. HILLIKER,
BY D. Emmett Thompson
HIS ATTORNEY.

April 13, 1965 — A. E. HILLIKER — 3,178,684
TRAFFIC CONTROL SYSTEM
Filed Aug. 22, 1960 — 12 Sheets-Sheet 5

FIG.3.

INVENTOR:
ARTHUR E. HILLIKER,
BY D. Emmett Thompson
HIS ATTORNEY.

April 13, 1965  A. E. HILLIKER  3,178,684
TRAFFIC CONTROL SYSTEM
Filed Aug. 22, 1960  12 Sheets-Sheet 6

FIG. 3A.

INVENTOR:
ARTHUR E. HILLIKER,
BY D. Emmett Thompson
HIS ATTORNEY.

FIG. 4.

INVENTOR:
ARTHUR E. HILLIKER,
BY *D. Emmett Thompson*
HIS ATTORNEY.

April 13, 1965

A. E. HILLIKER

3,178,684

TRAFFIC CONTROL SYSTEM

Filed Aug. 22, 1960

INVENTOR:
ARTHUR E. HILLIKER,
BY D. Emmett Thompson
HIS ATTORNEY.

April 13, 1965     A. E. HILLIKER     3,178,684
TRAFFIC CONTROL SYSTEM

Filed Aug. 22, 1960     12 Sheets-Sheet 9

FIG.5.

INVENTOR:
ARTHUR E. HILLIKER,
BY *D. Emmett Thompson*
HIS ATTORNEY.

April 13, 1965  A. E. HILLIKER  3,178,684
TRAFFIC CONTROL SYSTEM
Filed Aug. 22, 1960  12 Sheets-Sheet 12

FIG. 7

ϕ = phase

FIG. 8

INVENTOR.
ARTHUR E. HILLIKER.
BY
D. Emmett Thompson
HIS ATTORNEY.

United States Patent Office 3,178,684
Patented Apr. 13, 1965

3,178,684
TRAFFIC CONTROL SYSTEM
Arthur E. Hilliker, Pulaski, N.Y., assignor to Crouse-Hinds Company, Syracuse, N.Y., a corporation of New York
Filed Aug. 22, 1960, Ser. No. 51,052
5 Claims. (Cl. 340—37)

This invention relates to and has as a general object a new and improved traffic control system.

Certain present day intersections between a main and a cross street are so designed as to provide a separate lane for vehicles approaching the intersection from either direction on the main street which desire to turn left in the intersection off the main street and on to the cross street. These traffic movements are known as "left-turn" or "minor" movements. As is obvious, each left-turn movement interferes not only with the opposing street through movement of traffic on the main street, but also interferes with the movement of traffic through the intersection on the cross street. Previous traffic control systems for such intersections have suffered from one or more defects; for example, previous control systems have found it necessary to utilize three separate traffic controllers in combination to independently control the traffic movements through such an intersection in response to vehicle actuations on the movements.

Such systems have in all cases operated to associate the left-turn or minor movement with a particular or parent phase on the master controller. The interval for the minor or left-turn movement was thus taken out of the interval for the parent phase and consequently upon completion of the minor movement right-of-way signal display, the right-of-way signal display was returned to the parent or associated phase. That is, the right-of-way signal display could not dwell on the minor or left-turn movement.

Such systems are both expensive and have proved to be inefficient in moving the traffic through the intersection.

Accordingly, it is a more specific object of this invention to provide a new and improved traffic control system for controlling the movement of vehicular traffic through the intersection of two streets, one of which is provided with left-turn lanes on each approach to the intersection, and wherein each of the movements independently receives the right-of-way signal display sequence in response to vehicle calls or demands.

More specifically, it is an object of this invention to provide a new and improved traffic control system for an intersection having at least two left-turn movements by the combination of a pair of three-movement full actuated traffic controllers wherein each of the movements of traffic through the intersection are independently actuated by traffic proceeding in the particular movement.

Further, it is an object of this invention to provide a new and improved traffic control system for an intersection having at least two left-turn movements and a plurality of straight through movements wherein the right-of-way signal display may dwell on any of said movements and wherein each of said movements is completely independent of the other movements so that the right-of-way signal display will be presented to each of said movements only in response to a vehicle call or demand, and wherein the right signal display interval for any of said movements will be extended to a predetermined maximum in response to repeated vehicle calls.

In the co-pending application of W. M. Jeffers, Serial Number 47,492, filed August 4, 1960, there is disclosed a full-actuated-three-movement traffic controller. As will be hereinafter described in detail, the traffic control system comprising the invention of this application comprises the combination of two such full-actuated three-movement traffic controllers for controlling traffic movement through an intersection of first and second streets each having straight through lanes and, wherein one of said streets has, in addition, left-turn lanes on each approach to the intersection. Traffic is controlled in response to actuation by vehicular traffic in each movement in a manner whereby the left-turn traffic movements are controlled by a signal phase of each controller and the straight through movements on the same street are controlled by additional and different phases of each controller while the movement of traffic on the other street is jointly controlled by the remaining phase on each controller.

In describing the invention comprising the subject matter of this application, reference will be made to the copending application of Jeffers for a more complete description of the operation of a full-actuated three-movement controller and the same reference numerals used in that application will be used on the same components of the invention comprising the subject matter of this application. It is to be understood that the controller disclosed in the Jeffers' application above-referred to, is referred to hereinafter in the specification and claims of this application as a multi-phase cyclical timer for ease of description, and that the terms timer and controller have been used interchangeably. However, since two such controllers are used in the present invention one of said controllers will be designated by the Roman numeral I and the other by the Roman numeral II. The components of controller II will be given the same reference numbers as those of I, but each such reference numeral will be furnished with a prime to distinguish from the components of controller I.

The invention consists in the novel features and in the combinations and constructions hereinafter set forth and claimed.

In describing this invention reference is had to the accompanying drawings in which like characters designate corresponding parts in all views.

In the drawings:
FIGURES 1a–5a inclusive, are circuit diagrams of the remaining portions of the control system shown in FIGURES 1 to 5, and when
FIGURES 1a to 5a are placed side by side with FIGURES 1 to 5 the circuit diagram of the complete control system is shown in each stage of operation with the heavy lines indicating those portions of the system then conducting current.

Briefly described, the invention of this application comprises a traffic control system for controlling the movement of vehicular traffic through intersections formed by first and second streets, each of said streets having straight through lanes, one of said streets having left-turn lanes on each approach to said intersection, all of said lanes being provided with traffic detection means, traffic signals associated with each of said lanes, a plurality of multiphase cyclical timers, also referred to as traffic controllers connected in circuit with said detectors and signals for according a right-of-way signal display sequence to said lanes in response to vehicle actuations of said detector means, said controllers having an interconnected phase and being operable upon actuation of said detector means in one of the approaches to said intersection on the straight through lanes on one of the said streets to synchronize the said controllers to jointly control the traffic movements through said intersection on said straight through lanes, one of the left-turn lanes and the opposing straight through lane on the other street being controlled by additional and different phases of one of said controllers and the remaining left-turn lane and opposing straight through lane on said other street being controlled by additional and different phases on the other of said controllers.

Figure 1:
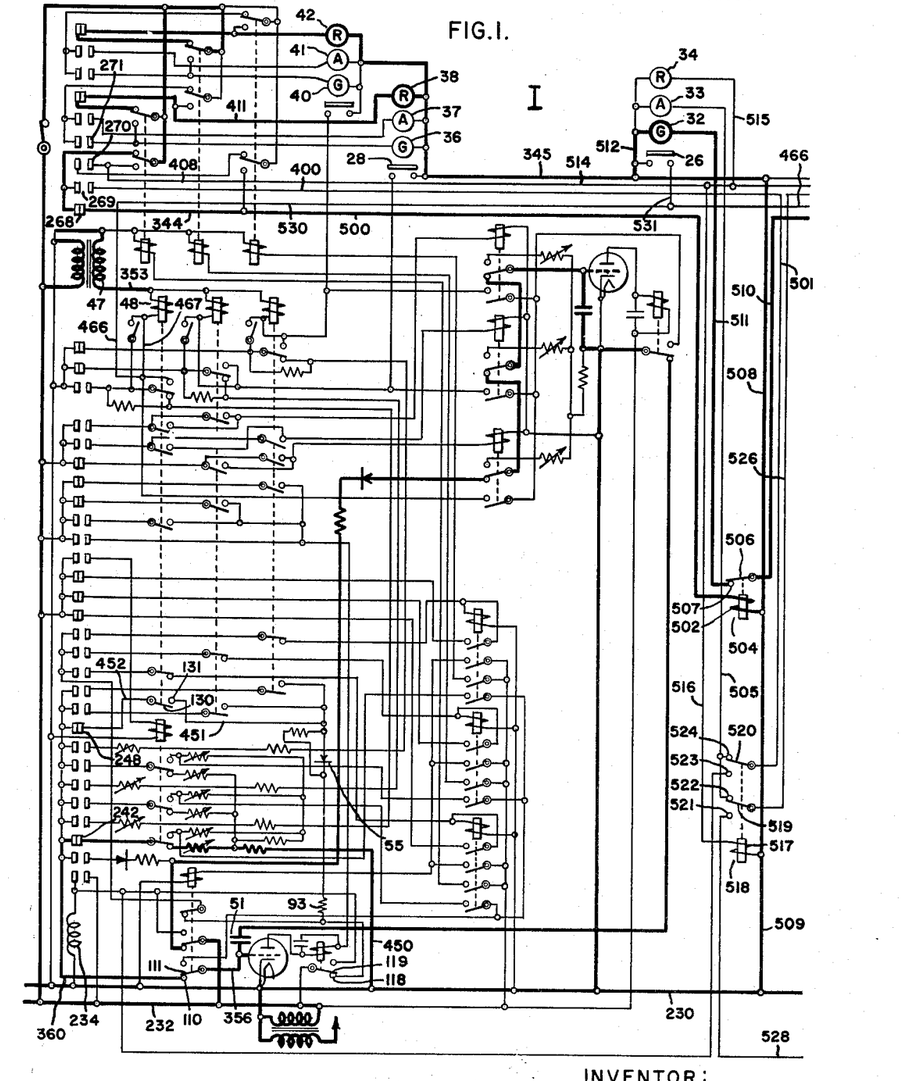
FIGURES 1–5 inclusive, are portions of the circuit diagrams of the control system.
Figure 1A:
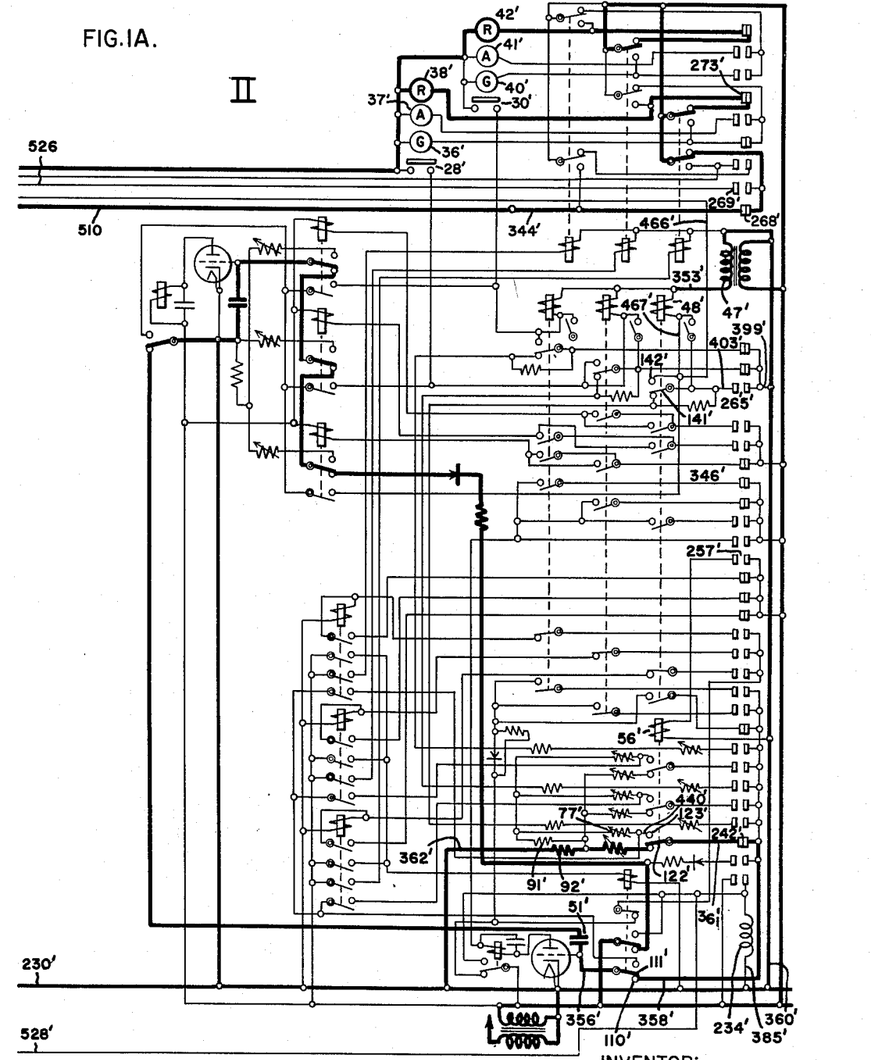

In FIGURES 1 and 1a, controller I and controller II are identical to the controller shown and described in the Jeffer's application, Serial Number 47,492, and as above set forth the components of both controllers have been given the same reference numerals with the reference numerals of the controller II being primed, to avoid confusion. The means for interconnecting the two controllers so as to provide the control system for controlling the traffic movements as previously briefly described, is shown to the right of FIGURE 1.

Figure 8:
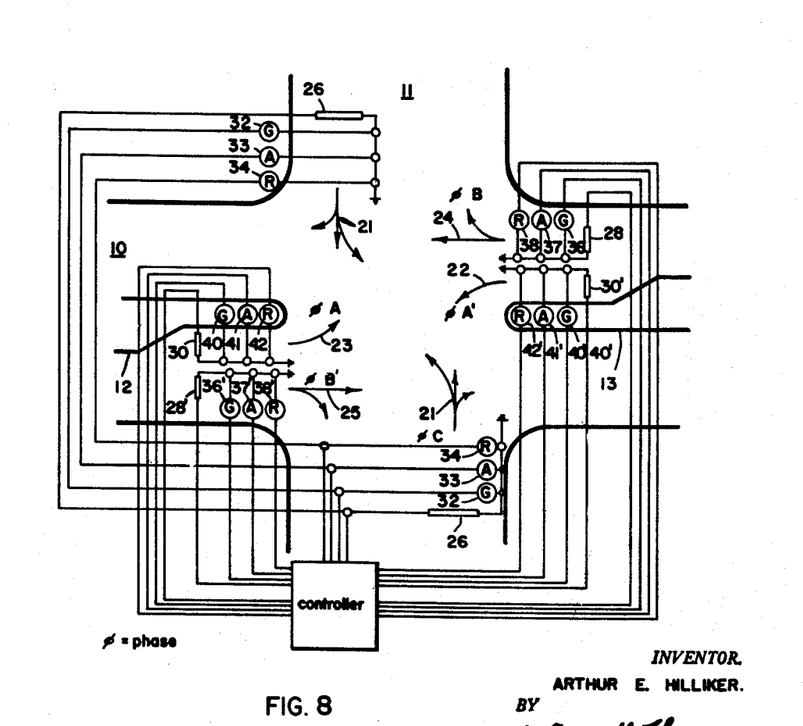
FIGURE 8 is a schematic illustration of the intersection showing the controller connections to the signals and detectors and indicating the various traffic movements through the intersection.

The intersection which the system is intended to control is shown in FIGURE 8 as comprising a main street 10 and a cross street 11. The main street 10 is provided, on both approaches, with traffic islands 12 and 13, so designed as to provide left-turn lanes, as will be obvious from the figure.

The various movements of traffic through the intersection are designated by the heavy arrow lines 21 to 25, inclusive, the number one movement, indicated by arrow line 21, being the movement of traffic through the intersection of cross street 11; the number two movement, indicated by arrow line 22, being the left-turn movement for traffic approaching the intersection on main street 10, adjacent the traffic to island 13; the number three movement indicated by arrow line 23, being the left-turn movement for traffic approaching the intersection on main street 10, adjacent the traffic island 12; the number four movement indicated by arrow line 24, being the straight-through movement of traffic approaching the intersection on the main street 10 from the right-hand side of the figure, and the number five movement, indicated by arrow line 25, being the straight-through movement of traffic approaching the intersection on the main street 10 from the left-hand side of the figure. As will be understood, traffic movement number one includes both straight-through and right-turn traffic movements on the main street 10, but the movements two and three are limited to left-turn traffic only.

Positioned adjacent each of the movements are: proceed or green, clearance or amber, and stop or red traffic signals; the signals 32, 33 and 34 being positioned to control movement number one on the cross street 11; signals 40', 41' and 42' being positioned to control movement number two; signals 40, 41 and 42 being positioned to control movement number three; signals 36, 37 and 38 being positioned to control movement number four and signals 36', 37' and 38' being positioned to control movement number five.

As will be obvious, each group of left-turn signals and its opposing group of straight-through signals are controlled from the same controller, so no conflicting right-of-way indications may show simultaneously, since these movements are interfering traffic movements; that is, movement number three, which interferes with movement number four, is controlled by the signals 40, 41 and 42 of controller I, while movement number four is controlled by the signals 36, 37 and 38 of controller I, and consequently due to the operation of the controller as described in the Jeffers application, the proceed signals 36 and 40 of this controller cannot be simultaneously energized so as to give the right-of-way to the conflicting movements numbers three and four. In like manner movements two and five will not conflict.

Referring now to FIGURES 1 and 1a, for purposes of description, the operation of the system comprising the preferred embodiment of the invention is shown at rest with the proceed or green signal 32 being displayed on each approach of cross street 11 to traffic movement number one, as is indicated by the extended arrows 21 in FIGURE 8. As described in the Jeffers co-pending application, each of the controllers I and II has its cam unit contacts 268 and 268' closed in this position to provide a proceed signal indication to movement number one. In FIGURES 1 and 1a, however, controller I has been modified by connecting the line 500 to the line 344 so that a hot feed is supplied to the line 500 through the closed cam contacts 268, and the line 344, in this position of the controller.

As seen in FIGURES 1 and 1a, the signals 32, 33 and 34 are connected between both controllers and the line 500 is connected through the coil 502 of relay 504 having an armature 506 and a fixed contact 507, to the line 508, which is in turn, connected by line 509 to the common return line 230.

The closure of cam unit contacts 268' of controller II connects a hot feed from the line 344' to the line 510, which is connected through the armature 506, which has been moved downwardly into engagement with the fixed contact 507, by the energization of relay 504, to place a hot feed on the line 511, which is connected through the proceed signal 32 to line 512, which is connected to line 345, which in turn, is connected by lines 508 and 509 to the common return line 230, thus energizing signal 32.

Similar to the manner described in the Jeffer application, the stop signals 38, 38', 42 and 42' are energized to present stop indications to movements number two, three, four and five, as is indicated by the heavy circled lines on those signals in FIGURES 1 and 1a.

The controllers numbers I and II are, in FIGURES 1 and 1a, in the rest position which is the extension interval for the signal indication to traffic movement number one, as is more completely shown and described in the Jeffers application.

With the controllers in the position as shown in FIGURES 1 and 1a, let it be assumed that the detector 28 is actuated by traffic approaching the intersection in movement number four. This actuation indexes controller I to position four, shown in FIGURE 2, in the manner described in the Jeffers' application.

Figure 2:
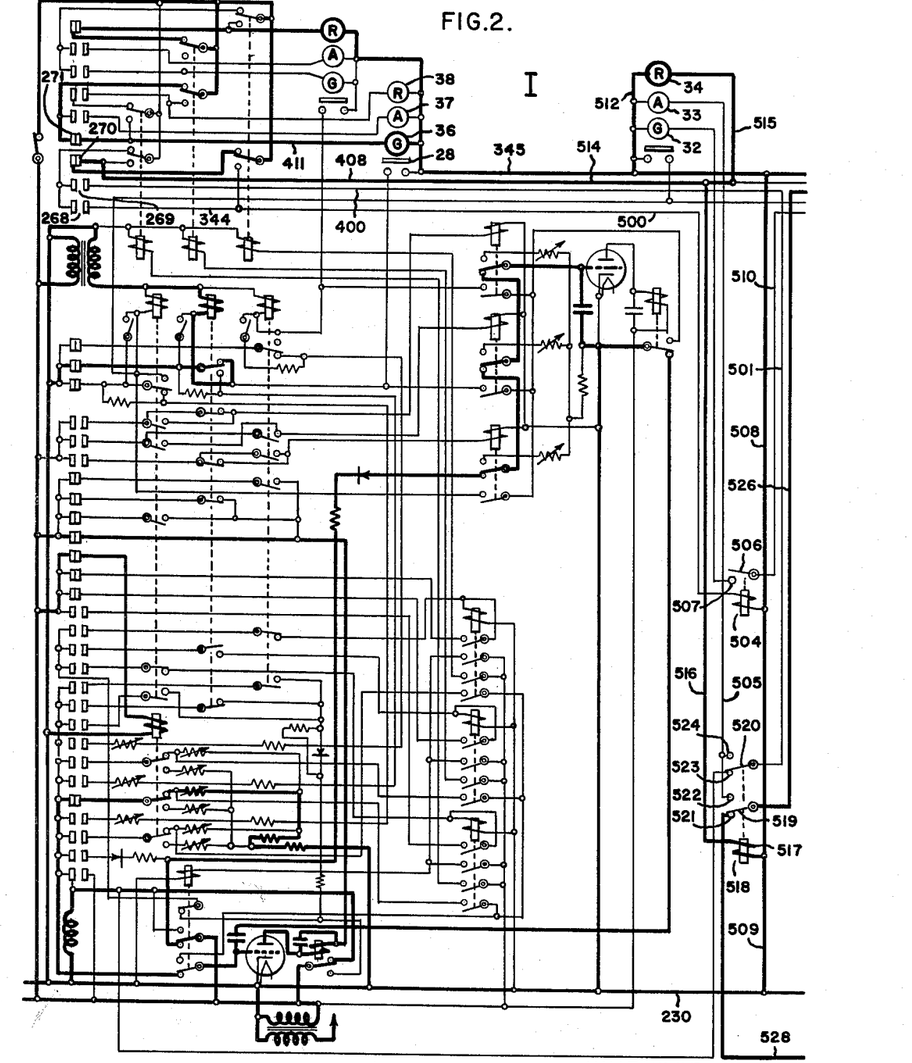

During the indexing the controller passes through position three in which position the clearance signal 33 for movement number one is energized through closed cam contacts 269, line 400, line 501, armature 520, contact 524, and line 505 which is connected through the amber signal 33 to the common return line 230 by lines 512, 345, 508 and 509. This circuit is broken when cam contacts 269 open thus de-energizing signal 33.

The green signal 36 is energized when controller I reaches position four by the closure of contacts 271 which provides a hot feed to the line 411. In like manner the closure of contacts 270 provides a hot feed through the line 408, this line being connected by the line 514 to the line 515, which in turn, is connected through the red or stop signal 34, associated with movement number one, to the line 512 which is connected by lines 345, 508 and 509 to the common return line 230, thus energizing the signal 34. The traffic signal pattern for this condition is indicated by the heavy circled lines on signals 42, 36, 34, 38' and 42' to indicate that traffic movement four is receiving the proceed signal display.

The hot feed on the line 514 is transferred by the line 516, through the coil 517 of the relay 518, having a pair of armatures 519 and 520 and fixed contact points 521, 522, 523 and 524. The opposite side of the coil 517 of relay 518, is connected by line 509 to the common return line 230, whereby the hot feed on the line 516 energizes the relay 518 to pull the armatures 519 and 520 downwardly into engagement with the fixed contact points 521 and 523, respectively, to prepare the system for the next actuation on movements number two or number five controlled by the controller II. The removal of the hot feed from lines 344 and 509 by the opening of the cam unit contacts 268, de-energizes the relay 504, so that the hot feed on line 510 from controller II, as described in connection with FIGURE 1a, is ineffective since the de-energization of relay 504 returns the armature 506 to the upper position away from the fixed contact 507.

The controller I as shown in FIGURE 2, is in position four, as described in the Jeffers' application, and is operating to time the initial interval during which the proceed signal 36 is displayed to traffic movement number four. As described in the Jeffers' application, upon completion of the timing of the initial interval the controller will be indexed to position five, to time the extension interval, upon completion of which the controller will rest in that position.

Thereafter the controller I is free-running between movements three and four, as described in the Jeffers' application, to present the signal display sequence to movements number three and four in response to vehicle actuations in these movements.

Figure 3:
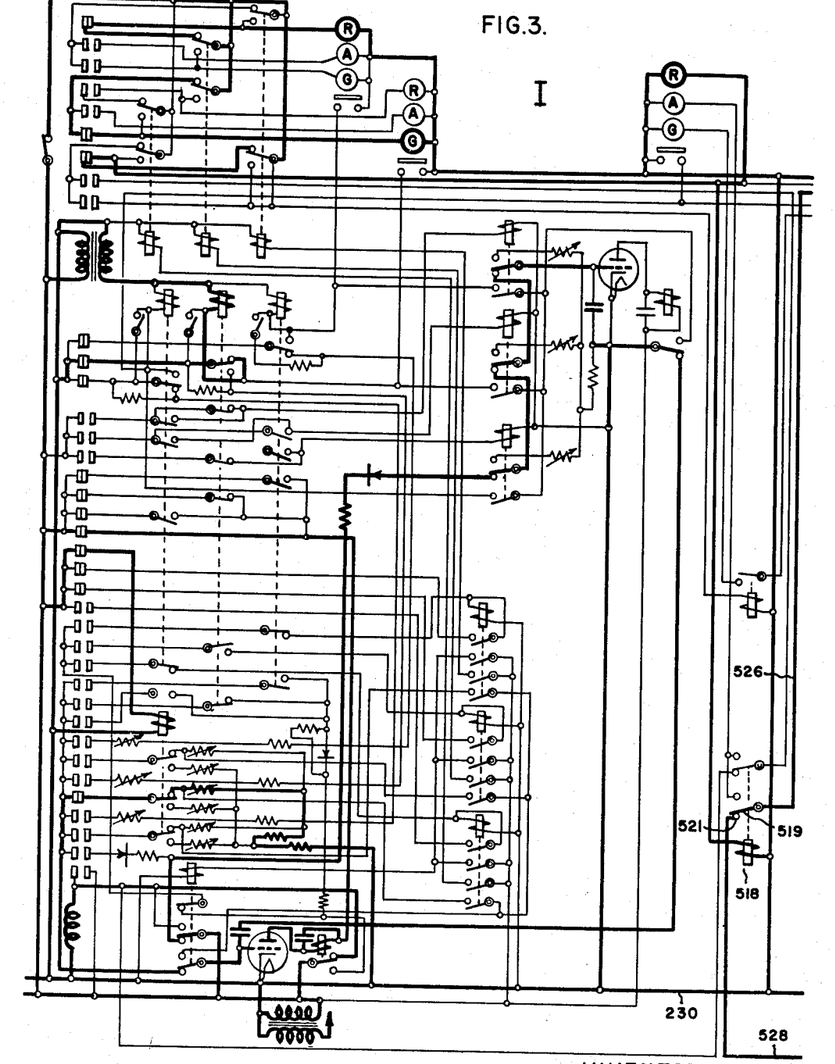
Figure 3A:
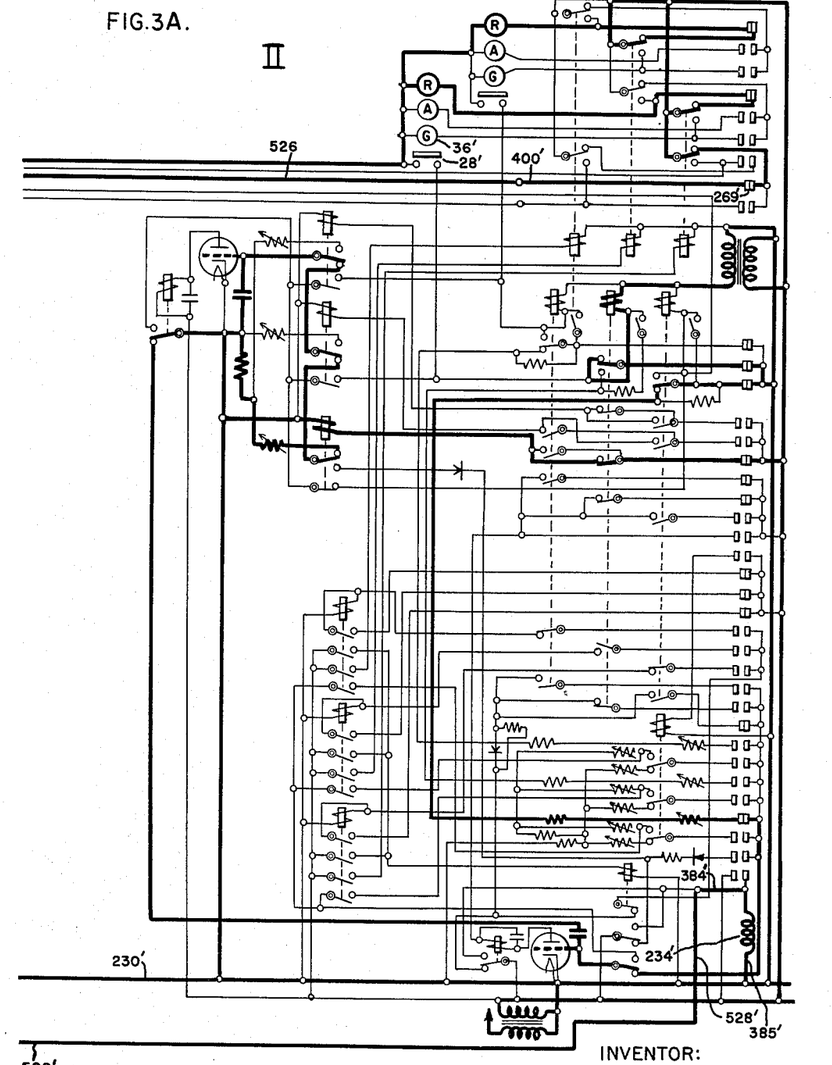

At this point let it be assumed that an actuation of detector 28' in movement five, has indexed controller II to the position shown in FIGURE 3a. In this position the closed cam unit contacts 269' place a hot feed on the line 400', which is connected to line 526. The line 526 is connected through the armature 519, which has been previously moved into engagement with the fixed contact point 521 by the energization of the relay 518, as described in connection with FIGURE 2, to the line 528', which is connected to line 384' through the motor coil 234' to line 385', which in turn is connected to the common return line 230', thereby energizing the motor of the cam unit of controller II, to index the controller to position four, similar to that shown for controller I in FIGURE 2, in order to energize the proceed signal 36' for movement number five. As will be seen this indexing is effected without changing the stop signal indication being displayed to movement number one.

Figure 2A:
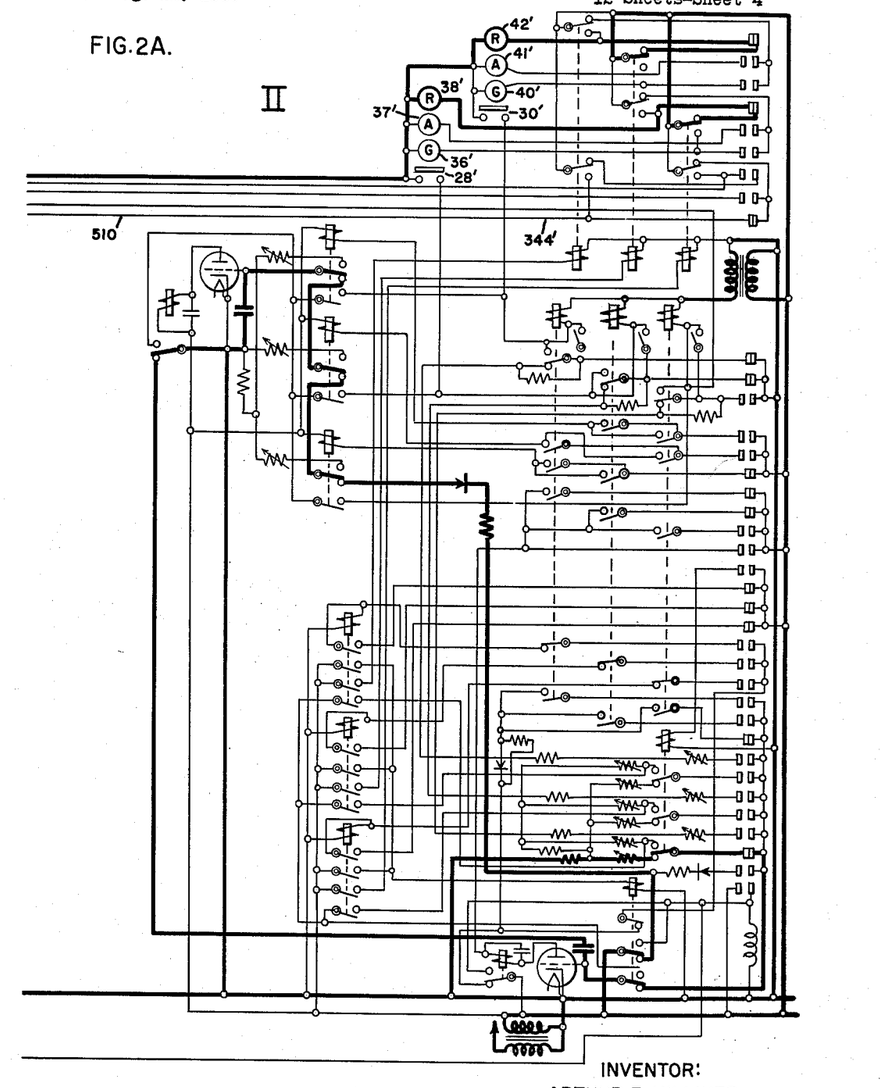

The controller II, as shown in FIGURE 3a, is being indexed from position two, as shown in FIGURES 1a and 2a, to position three, with the sequence of events taking place as more completely described in the Jeffers' application. Position three of controller II is the interval during which the clearance signal for movement number one is normally being timed. However, as above described, the clearance signal for movement number one is not energized, the stop signal being continually displayed to the movement number one. Upon completion of interval three, the controller II is indexed to position four in which position the controller is timing the initial interval, during which the proceed signal is being displayed to movement number five. Upon completion of the timing of the initial interval, controller II is then indexed to position five, which is the extension interval for movement number five. Upon completion of the timing of the extension interval, controller II will rest, and thereafter controller II will be free-running between movements number five and two in response to vehicle actuations in these movements.

The condition of the signals for the circuits shown in FIGURES 3 and 3a is illustrated by the heavy circled lines on signals 42, 36, 34, 38' and 42' to indicate that traffic movement five is awaiting the proceed indication and traffic movement four is proceeding through the intersection.

Figure 4:
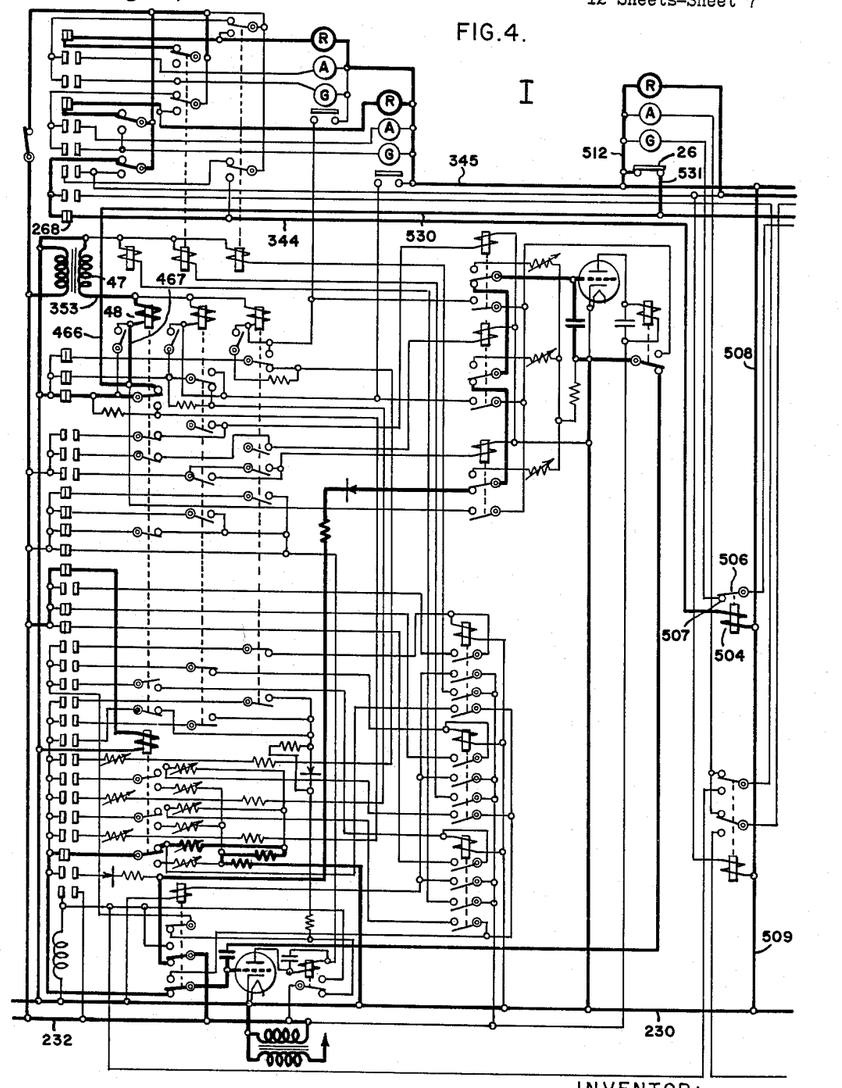
Figure 4A:
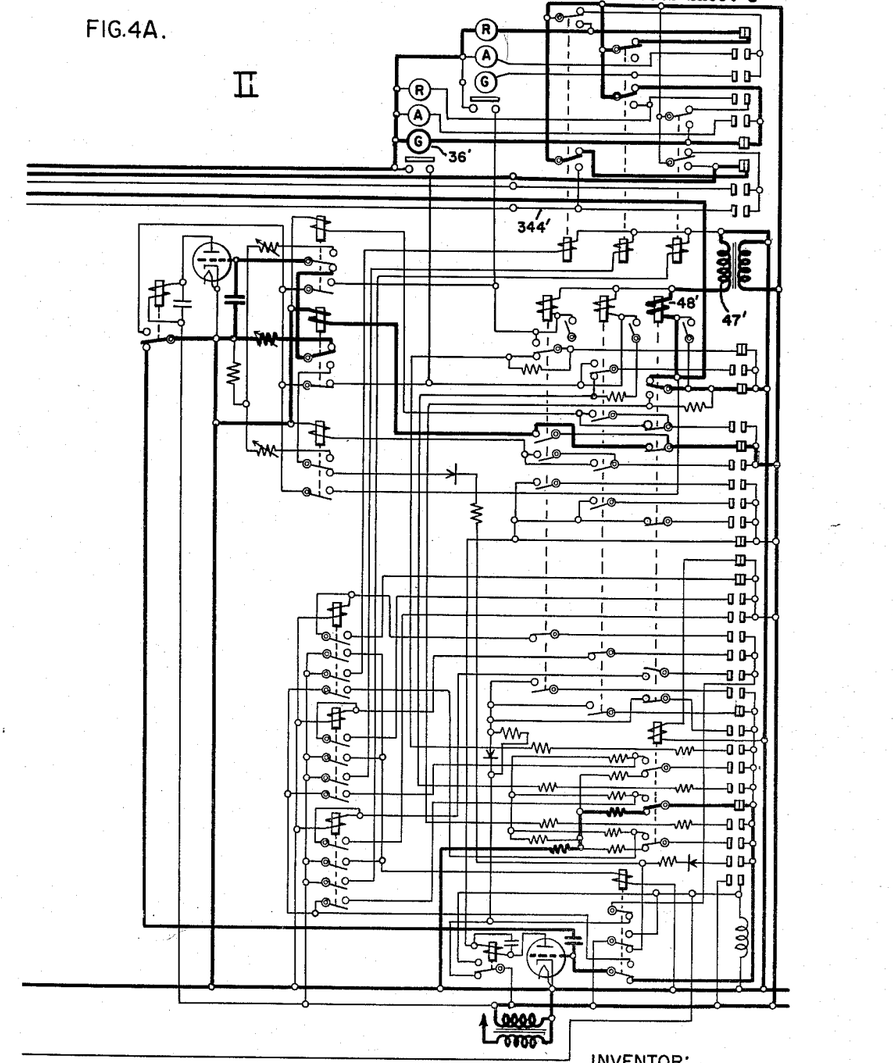

At this point let it be assumed, for purposes of illustration, that a detection now takes place on detector 26 for movement number one, while there is continuous traffic in movement number five, but no further traffic in movement number four. Referring now to FIGURES 4 and 4a, the actuation of the detector 26 completes a circuit from the secondary of the detector transformer 47, in controller I, through line 353, detector relay coil 48, line 467, line 466 which is connected by line 530 to line 531 which is connected through the closed detector 26 to line 512, which in turn is connected by line 345 to line 508 and line 509 to the common return line 230. The closure of the detector 26 also completes a similar circuit through the coil of relay 48' of controller II, as illustrated in FIGURE 4a, to energize detector relay 48' as well as detector relay 48. At this point let it be assumed that traffic in movement number five now ceases. Since the closure of the detector 26 has energized both detector relays 48 and 48', controller I is first indexed to position 1 to prepare to display the proceed signal to movement number one. The cessation of traffic on movement number five now permits controller II to be indexed to position number one, due to the energization of detector relay 48'. As seen in FIGURE 4, the indexing of controller I to position 1 has again placed a hot feed on the line 344 by the closure of the cam unit contacts 268, which through the circuit described in connection with FIGURE 1, serves to energize the relay 504 to move the armature 506 downwardly into engagement with the fixed contact point 507. Nothing occurs, however, by this energization since there is no hot feed line 344' of controller II.

Controller I actually completes its normal timing function in position one but since controller II has not yet reached position one the stop signal 34 remains energized for display, to movement number one, consequently the timing of controller I, in position one, has no effect on the signal display.

Figure 5:
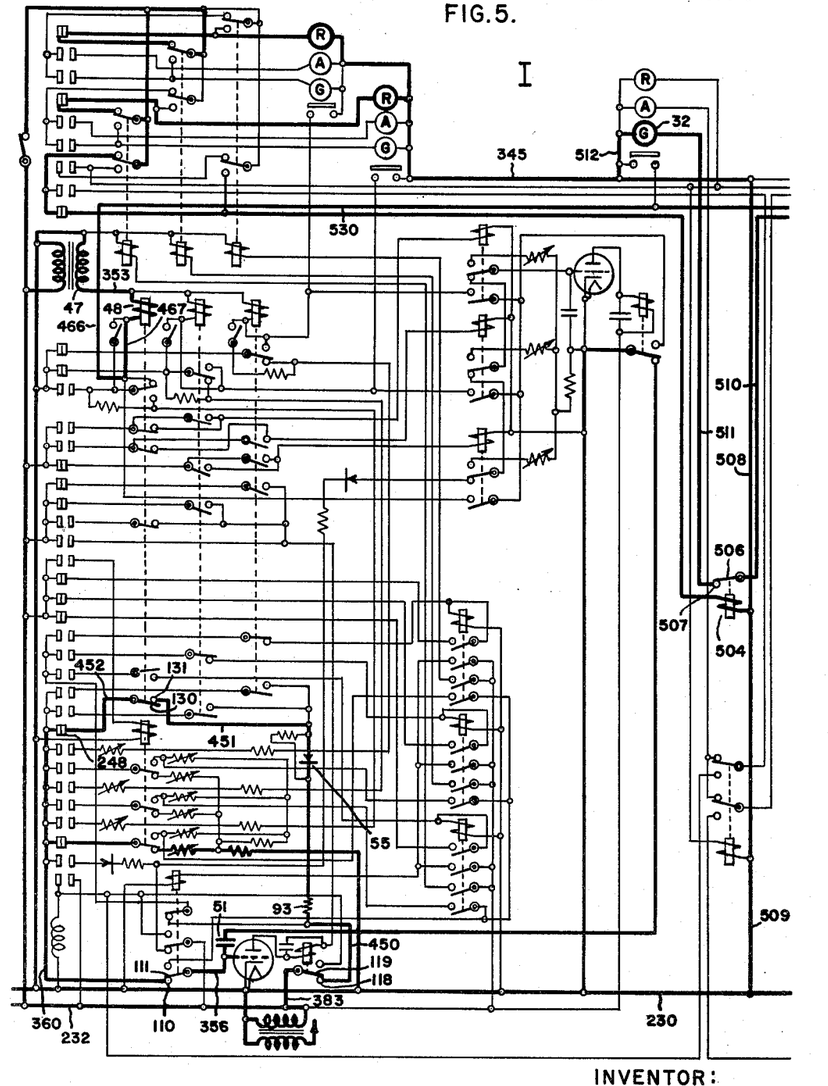
Figure 5A:
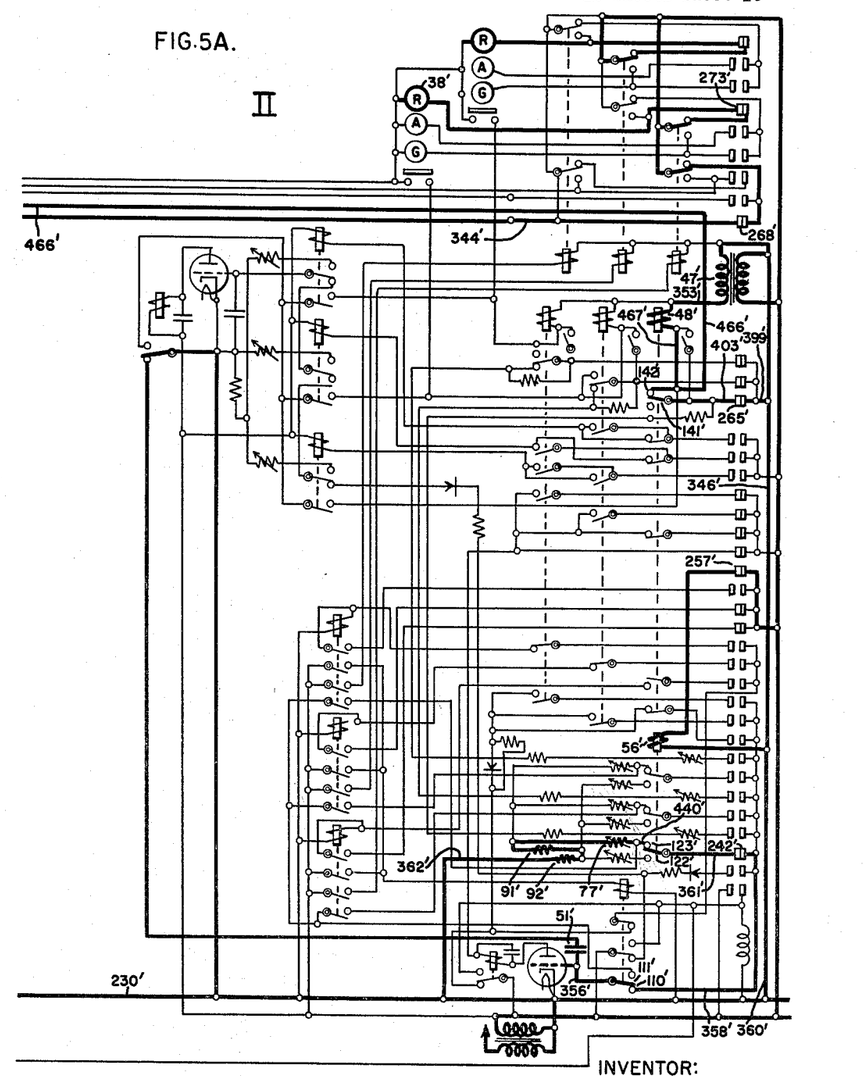

Referring now to FIGURES 5 and 5a, it will be seen that when the controller II reaches position 1, the closure of the cam unit contacts 268' places a hot feed on the line 344'. This hot feed is connected by the line 510 and contacts 506 and 507 to line 511 which is connected through the proceed signal 32 for movement number one to the line 512, which is connected, as previously described, to the common return line 230, thus energizing the proceed signal 32 for movement number one. The initial interval during which this signal is displayed to movement number one is, therefore, timed by controller II, the timing being initiated simultaneously with the energization of the proceed signal 32. Hence it will be seen that the last controller to actually reach position one is the controller which times the initial interval for display of the proceed signal to traffic movement number one.

Upon completion of the timing of the initial interval the controller I moves into position two, which is the proceed signal extension interval for movement number one, as is shown on controller I in FIGURE 5. This controller, however, does not time the extension interval because the controller II is in position one, in which position the memory contacts 265' for position one are closed until this controller reaches position two. Accordingly, the closed contacts 265' hold both detector relays 48 and 48' energized through the following circuits. Detector relay 48' is energized through the circuit comprising secondary of transformer 47, line 353, coil of relay 48, line 467, line 466, line 530, line 466', closed contacts 142' and 141', line 403', closed cam contacts 265', line 399' and line 346' which is connected to the common return line 230'.

Similarly detector relay 48' is held energized through the circuit comprising the secondary of relay transformer 47', line 353', coil of relay 48', line 467'; fixed contact 142', armature 141', line 403', closed contacts 265', line 399' and line 346' which is connected to the common return line 230'.

The energized detector relay 48 in controller I causes the armature 130 to move upward into engagement with the fixed contact 131. This completes a circuit from the hot line 232 through line 383, armature 119, fixed contact 118, line 450, resistor 93, rectifier 55, line 451, fixed contact 131, armature 130, line 452, closed cam unit contacts 248, line 360, fixed contact 110, armature 111 and line 356 which is connected to the topside of the timing capacitor 51. Due to the presence of the rectifier 55 in this circuit, a negative potential is placed on the top of the capacitor 51, thereby preventing the capacitor from discharging through the closed cam unit contacts 242, which in turn, prevents the controller from timing in this position.

Referring now to controller II in FIGURE 5a, when this controller is indexed to the point where the cam unit contacts 268' and 273' are closed, the green or proceed signal 32 displayed to movement number one is energized through the circuit comprising the hot feed placed one line 344' by the closing of the cam unit contacts 268', line 510, armature 506, fixed contact 507, line 511, through signal 32 to line 512 which is connected by line 345 and lines 508 and 509 to the common return line 230. The closing of the cam unit contacts 273' energizes the red or stop signal 38' to movement number five through the circuit shown and more completely described in the Jeffers' application.

The initial proceed interval for movement number one is now timed by controller II, simultaneously with the energization of the signal 32 through the circuit shown in the lower portion of the controller II as previously described. Controller II is now in the number one position as shown in the cam chart in FIGURE 19 of the Jeffers' application. In this position the cam unit contacts 257' are closed to energized the relay 56' by the circuit described in connection with the Jeffers' application. The energization of relay 56' causes the armature 122' to move upwardly into engagement with the fixed contact 123' thereby completing the discharge circuit for the timing capacitor 51'. This discharge circuit times the interval for this position of the controller and comprises lines 536', contacts 111' and 110', line 358', line 360', closed cam unit contacts 242', line 361', contacts 122' and 123', line 440', variable resistor 77', fixed resistors 91' and 92' and line 362' which is connected to the common return line 230'. Consequently, the green initial interval for traffic proceeding in movement number one is timed by controller II.

Upon completion of the initial interval, controller II indexes into position number two, this being the extension interval hereby opening contacts 265' and 257', as described in the Jeffers' application.

The opening of the contacts 265' in the controller II breaks both the circuits previously described, which hold the relays 48 and 48' energized, thereby de-energizing these relays and permitting both controllers to time the extension interval and in absence of any further actuation, the controllers return to the rest position, as shown in FIGURES 1 and 1a.

For the purposes of simplification in the foregoing description of the synchronization of controllers I and II, it has been assumed that there was no traffic demand for movements two or three, so that the actuation of the detector 26 for movement number one caused both controllers to skip the presentation of the right-of-way signal display to these movements, in order to return the right-of-way signal display sequence to traffic movement number one. It is to be understood, however, that should these movements receive calls or demands from vehicle actuations they will be presented with the right-of-way signal display sequence in the manner more completely described in the Jeffers' application. Further, should the traffic demand be different from that previously described in connection with the synchronization of controllers I and II, the operation for synchronizing these controllers to present the right-of-way signal display sequence to movement number one will be essentially the same, since the control system is symmetrical. For example, if, due to traffic demand, controller II is first called to position one, controller I will time the initial interval during which the proceed signal is displayed to movement number one, after which both controllers will simultaneously time the extension interval for traffic movement number one.

Figure 6:
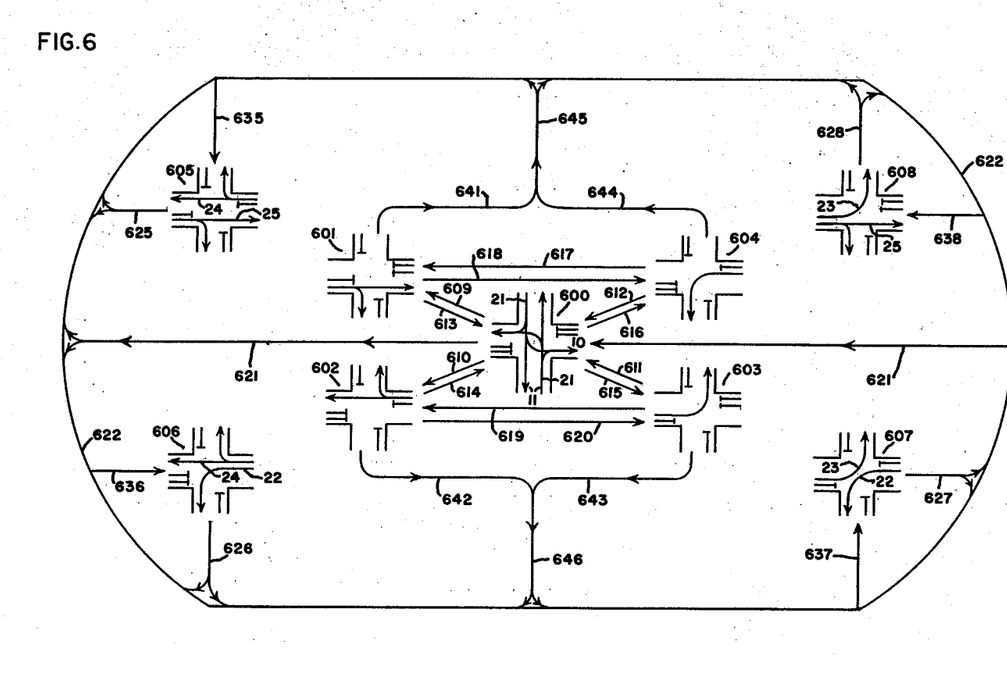
FIGURE 6 is a diagrammatic illustration in the nature of a flow sheet showing the various types of traffic movement through the intersection.
Figure 7:
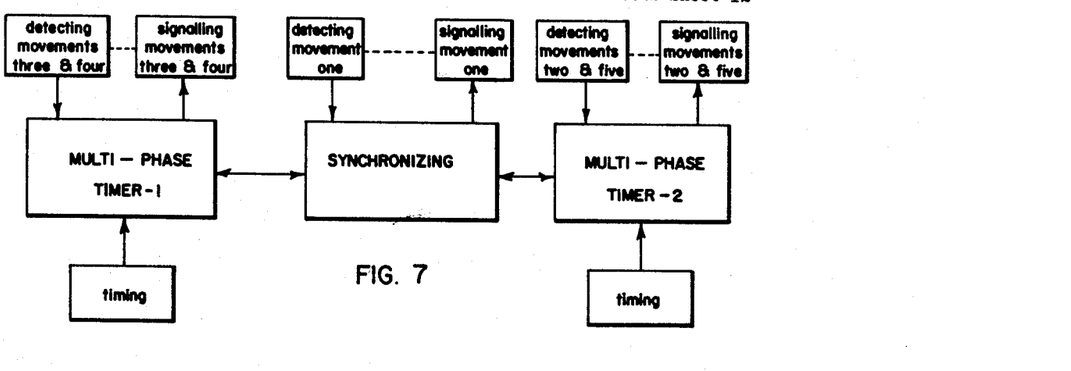
FIGURE 7 is a block function diagram of the controller comprising the preferred embodiment of the invention wherein the dashed lines indicate associated detector and signal means.

FIGURE 6 is a diagrammatic illustration of the various conditions of traffic movement control by the traffic control system comprising the subject of this invention. In the figure a plurality of intersections 600, 601, 602, 603, 604, 605, 606, 607 and 608 are shown as each having a different traffic movement pattern. Referring to intersection 600, the traffic on the cross street is shown as proceeding through the intersection, as is normal. The control system comprising the invention permits the traffic pattern in the intersection to be changed from that as shown in 600, to any one of the conditions shown in intersections 601 to 604 inclusive, as is indicated by the arrows 609 to 612, pointed in the direction of these intersections from the intersection 600. In like manner the traffic pattern may revert to that on intersection 600 from any of the conditions shown in intersections 601 to 604 inclusive, as is indicated by the arrows 613 to 616, pointing in the opposite direction from these intersections toward intersection 600. The arrows 617 and 618 between intersections 601 and 604, indicate that the traffic pattern may be switched by the control system from either condition to the other, as is also the case with intersections 602 and 603, as indicated by arrows 619 and 620.

The arrows moving to the left from intersection 600 on line 621, serve to indicate that the traffic pattern may be changed from the condition shown in intersection 600, by the control system to any of the conditions shown in the intersections 605 to 608 inclusive, directly from the condition shown in intersection 600 by following the arrowheads on the outside line 622 leading into any of the intersections 605 to 608 inclusive. When the traffic pattern is in any of the conditions shown in intersections 605 to 608 inclusive, it is merely necessary to follow the lines 625, 626, 627 and 628 into line 622 in order to determine what other pattern the control system may present to the intersection. For example, if the traffic pattern is that shown in intersection 608, it may be changed by suitable vehicle actuations to that shown in intersection 606. This is determined by merely following the line 628 into the line 622 and following the arrowheads around in either direction on this line until the line 636 is reached indicating that the traffic pattern may be changed to this condition from that shown in intersection 608. Accordingly the lines 635, 636, 637 and 638 are used to indicate how the traffic pattern may be changed to the condition to that shown in the intersections 605, 606, 607 and 608 respectively. In like manner by following the arrowheads on lines 641, 642, 643 and 644. It may be determined what other traffic patterns may be reached from the patterns shown in 601, 602, 603 and 604 respectively, by entering the outside line 622 from the lines 645 or 646.

It will be noted from FIGURE 6 that the traffic control system will function to change directly from any one movement to any other movement without first passing through any parent or associated movement, as has been necessary with previous control systems of this type.

What I claim is:

1. A traffic control system for controlling the movement of traffic through an intersection formed by first and second streets, said first street having at least two straight-through traffic movements, and two left turn traffic movements, said second street having at least one straight-through traffic movement, each of said movements having vehicle detection means and signal means associated therewith for according a right-of-way signal display to said movements in response to actuation of the detector means associated with said movements, said system comprising a first multi-phase cyclical timer having two of its phases connected to said signal means individual to two conflicting movements on said first street, a second multi-phase cyclical timer having two of its phases connected to signal means individual to two additional conflicting movements on said first street, each of said timers being rotatable through a plurality of discrete positions for sequentially energizing the proceed, clearance, and stop signals associated with each of said movements, timing means connected to each timer for timing the dwell of said timer in each of said discrete positions, actuation of said detector means associated with one of said movements on said first street energizing the timer connected to the signals associated with said movement to cycle the timer to a position energizing the proceed signal for the movement receiving the actuation, said timer dwelling in said position until an actuation is received on one of the detector means associated with the other movement controlled by said timer, actuation of the detector means on the second street cycling each of said timers to a position wherein both of said timers are in a third phase, synchronizing means for interlocking said timers with both of the timers in said third phase, said synchronizing means energizing the proceed signal for the through movement on said second street, the proceed signal display interval for said second street through movement being timed by the timing means associated with at least one of said timers, said synchronizing means cycling at least one of said timers to energize the clearance signal display to said second street upon actuation of the detector means associated with one of the movements on said first street, the dwell of said timer energizing said clearance signal display being timed by the timing means associated with at least one of said timers, actuation of the detector means associated with one of the movements on said first street energizing at least one of said timers to cycle said timer out of the interlocked phase position with the other timer upon completion of the timing interval of said clearance signal display to said second street.

2. The control system of claim 1, wherein each of said timers is provided with means for transferring the right-of-way signal display directly from the movement receiving said display to the movement receiving an actuation of its detector means, whereby any movement not having an actuation of its detector means will not receive a right-of-way signal display.

3. The control system of claim 1, wherein the timing of the proceed signal display interval for the movement on said second street is initiated by the timing means associated with the timer last cycled to the interlocked phase position.

4. A traffic control system for controlling the movement of traffic through an intersection of at least five separate traffic movements, one of said movements conflicting with each of the other movements and certain of said other movements conflicting with each other, each of said movements having a vehicle detection means and signal means associated therewith for according a right-of-way signal display to said movements in response to actuation of the detector means associated with said movements, said system comprising a first multi-phase cyclical timer having two of its phases connected to said signal means individual to two of the first four of said movements, said two movements being conflicting with each other, a second multi-phase cyclical timer having two of its phases connected to singal means individual to the two remaining movements being conflicting with each other, each of said timers being rotatable through a plurality of discrete positions for sequentially energizing proceed, clearance and stop signals associated with each of said movements, timing means connected to each timer for timing the dwell of said timer in each of said discrete positions, actuation of said detector means associated with one of said first four movements energizing the timer connected to the signals associated with said movement to cycle the timer to a position energizing the proceed signal for the movement receiving the actuation, said timer dwelling in said position until an actuation is received on one of the detector means associated with the other movement controlled by said timer, actuation of the detector means associated with the movement conflicting with all other movements cycling each of said timers to a position wherein both of said timers are in a third phase, synchronizing means for interlocking said timers with both of said timers in said third phase, said synchronizing means energizing the proceed signal for the movement conflicting with all other movements, the proceed signal display interval for said last mentioned movement being timed by the timing means associated with at least one of said timers, said synchronizing means cycling at least one of said timers to energize the clearance signal display to said last mentioned movement upon actuation of the detector means associated with one of said first four movements, the dwell of said timer energizing said clearance signal display being timed by the timing means associated with at least one of said timers, actuation of the detector means associated with one of said first four movements energizing at least one of said timers to cycle said timer out of the interlocked phase position with the other timer upon completion of the timing interval of said clearance signal display to said movement conflicting with all other movements.

5. A traffic control system for controlling the movement of traffic through an intersection of at least five separate traffic movements, one of said movements conflicting with each of the other movements and certain of said other movements conflicting with each other, each of said movements having a vehicle detection means and signal means associated therewith for according a right-of-way signal display to said movements in response to actuation of the detector means associated with said movements, said system comprising a first multi-phase cyclical timer having two of its phases connected to said signal means individual to two of the first four of said movements, said movements being conflicting with each other, a second multi-phase cyclical timer having two of its phases connected to signal means individual to the two remaining movements of said first four movements, said remaining movements being conflicting with each other, each of said timers being rotatable through a plurality of discrete positions for sequentially energizing proceed, clearance, and stop signals associated with each of said first four movements, timing means connected to each timer for timing the dwell of said timers in each of said discrete positions, actuation of said detector means associated with one of said first four movements energizing the timer connected to the signals associated with said movement to cycle the timer to a position energizing the proceed signal for the movement receiving the actuation, said timer dwelling in said position until an actuation is received on one of the detector means associated with the other movement controlled by said timer, actuation of the detector means associated with the movement conflicting with all other movements cycling each of said timers to a third position to energize synchronizing means, said synchronizing means energizing the right-of-way signal display for said last mentioned movement and interlocking said timers in said third position, means for timing the right-of-way signal display to said last mentioned movement, actuation of the detector means associated with one of said first four movements energizing at least one of said multi-phase timers to cycle said timer out of said interlocked position upon completion of the right-of-way signal display to the movement conflicting with all other movements.

References Cited by the Examiner

UNITED STATES PATENTS

| 2,883,643 | 4/59 | Du Vivier | 340—31 |
| 2,883,644 | 4/59 | Barker | 340—31 |
| 2,883,645 | 4/59 | Du Vivier | 340—31 |

FOREIGN PATENTS 535,709  4/41  Great Britain.

NEIL C. READ, *Primary Examiner.*

BENNETT G. MILLER, THOMAS B. HABECKER,
*Examiners.*